(12) United States Patent
Sakurai

(10) Patent No.: US 11,565,647 B2
(45) Date of Patent: Jan. 31, 2023

(54) VEHICLE OCCUPANT RESTRAINT SYSTEM

(71) Applicant: Toyota Jidosha Kabushiki Kaisha, Toyota Aichi-ken (JP)

(72) Inventor: Hideyuki Sakurai, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 17/376,791

(22) Filed: Jul. 15, 2021

(65) Prior Publication Data

US 2022/0063542 A1 Mar. 3, 2022

(30) Foreign Application Priority Data

Aug. 31, 2020 (JP) .............................. JP2020-146331

(51) Int. Cl.
| | | |
|---|---|---|
| B60R 21/214 | (2011.01) | |
| B60R 21/015 | (2006.01) | |
| B60R 21/013 | (2006.01) | |

(52) U.S. Cl.
CPC .......... B60R 21/214 (2013.01); B60R 21/013 (2013.01); B60R 21/01554 (2014.10)

(58) Field of Classification Search
CPC .................................................. B60R 21/214
See application file for complete search history.

(56) References Cited

U.S. PATENT DOCUMENTS

| | | | | |
|---|---|---|---|---|
| 7,934,763 B2* | 5/2011 | Mabuchi | .............. | B60N 2/0292 297/344.21 |
| 10,035,434 B2* | 7/2018 | Ohno | ................... | B60N 2/4279 |
| 10,940,822 B2* | 3/2021 | Niikuni | ................. | B60R 21/207 |
| 2017/0036565 A1* | 2/2017 | Ohno | ................... | B60N 2/4214 |
| 2018/0111575 A1* | 4/2018 | Ghannam | ......... | B60R 21/01512 |
| 2019/0084517 A1* | 3/2019 | Iyer | ........................ | B60R 21/214 |
| 2020/0130627 A1 | 4/2020 | Imura et al. | | |
| 2020/0290549 A1* | 9/2020 | Buice | .................... | B60R 21/217 |
| 2020/0346607 A1* | 11/2020 | Kim | ........................ | B60N 2/14 |
| 2021/0170980 A1* | 6/2021 | An | ........................ | B60W 30/08 |
| 2021/0268986 A1* | 9/2021 | Gould | ................... | B60R 21/214 |

(Continued)

FOREIGN PATENT DOCUMENTS

| | | | | |
|---|---|---|---|---|
| BR | 102016017566 A2 * | 2/2017 | ........... | B60N 2/0232 |
| CN | 114103866 A * | 3/2022 | ........... | B60R 21/013 |
| DE | 102019120890 A1 * | 2/2021 | | |

(Continued)

*Primary Examiner* — Nicole T Verley
(74) *Attorney, Agent, or Firm* — Dinsmore & Shohl LLP

(57) ABSTRACT

A vehicle occupant restraint system includes an airbag configured to deploy downward into a vehicle cabin from a roof of the vehicle cabin by receiving gas supplied, a region setting unit configured to set a predetermined region according to a position of the airbag, a collision sensor configured to detect a collision of a vehicle, a seat position detection sensor configured to detect at least one of a position and an angular position of a seat on which an occupant is seated, and a seat control unit configured to, when the collision sensor detects a collision of the vehicle and the seat position detection sensor detects that the seat is located in the predetermined region, execute control to change at least one of the position and the angular position of the seat. Thus, a positional relation between the seat and the airbag is appropriately controlled.

12 Claims, 9 Drawing Sheets

(56) References Cited

U.S. PATENT DOCUMENTS

2022/0063537 A1\* 3/2022 Lee ..................... B60R 21/231
2022/0080917 A1\* 3/2022 Sakurai ................ B60R 21/214

FOREIGN PATENT DOCUMENTS

| | | | | |
|---|---|---|---|---|
| DE | 102020107134 A1 | \* | 9/2021 | |
| DE | 102020107161 A1 | \* | 9/2021 | |
| DE | 102021119595 A1 | \* | 3/2022 | ........... B60N 2/0276 |
| DE | 112020002145 T5 | \* | 4/2022 | |
| FR | 2870179 A1 | \* | 11/2005 | ......... B60N 2/42745 |
| GB | 2557723 A | \* | 6/2018 | ............ B60R 21/01 |
| JP | 2016-030546 A | | 3/2016 | |
| JP | 2021017130 A | \* | 2/2021 | |
| JP | 6930504 B2 | \* | 9/2021 | |
| JP | 2022037156 A | \* | 3/2022 | |
| JP | 2022077924 A | \* | 5/2022 | |
| WO | 2018167919 A1 | | 9/2018 | |

\* cited by examiner

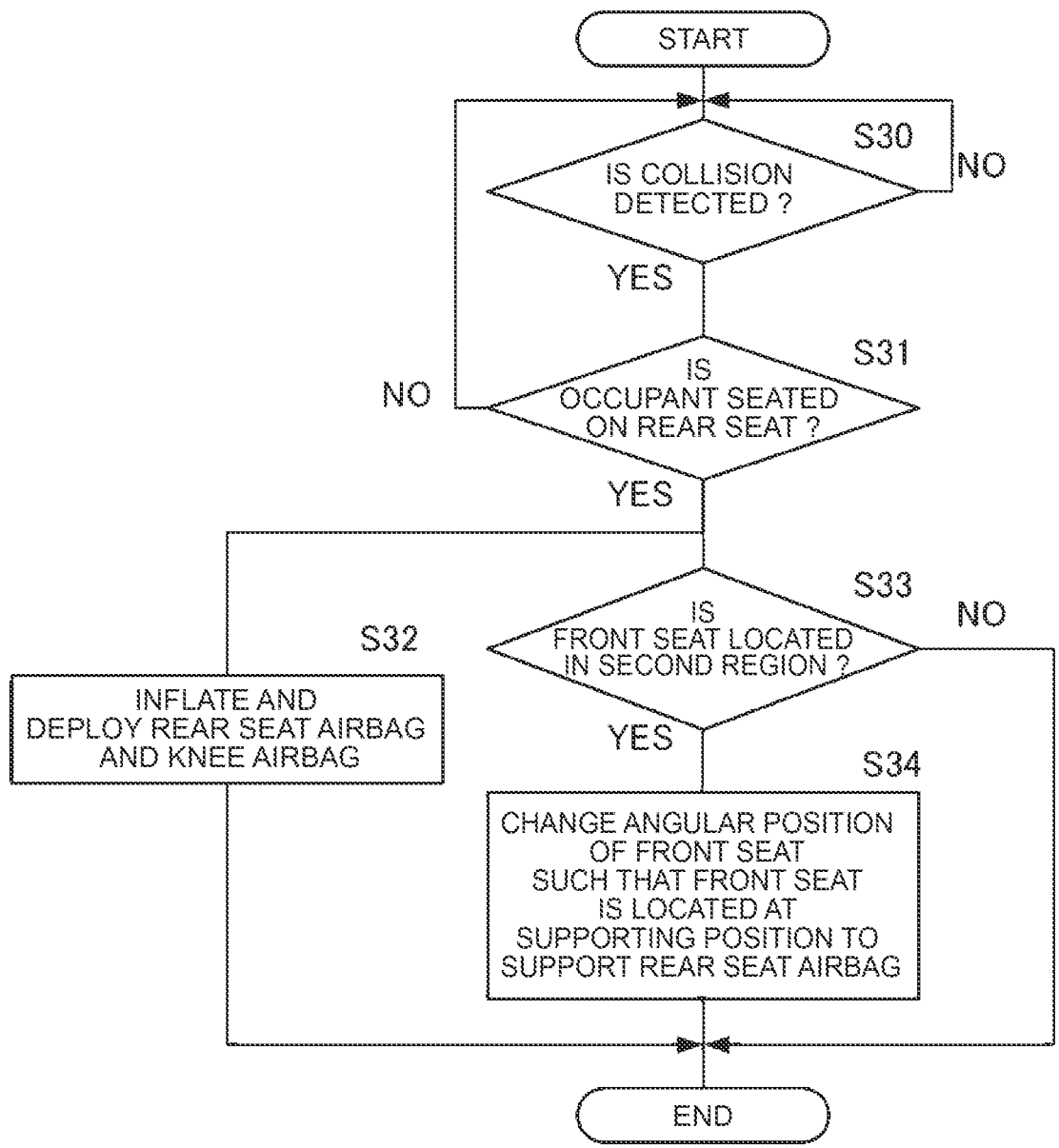

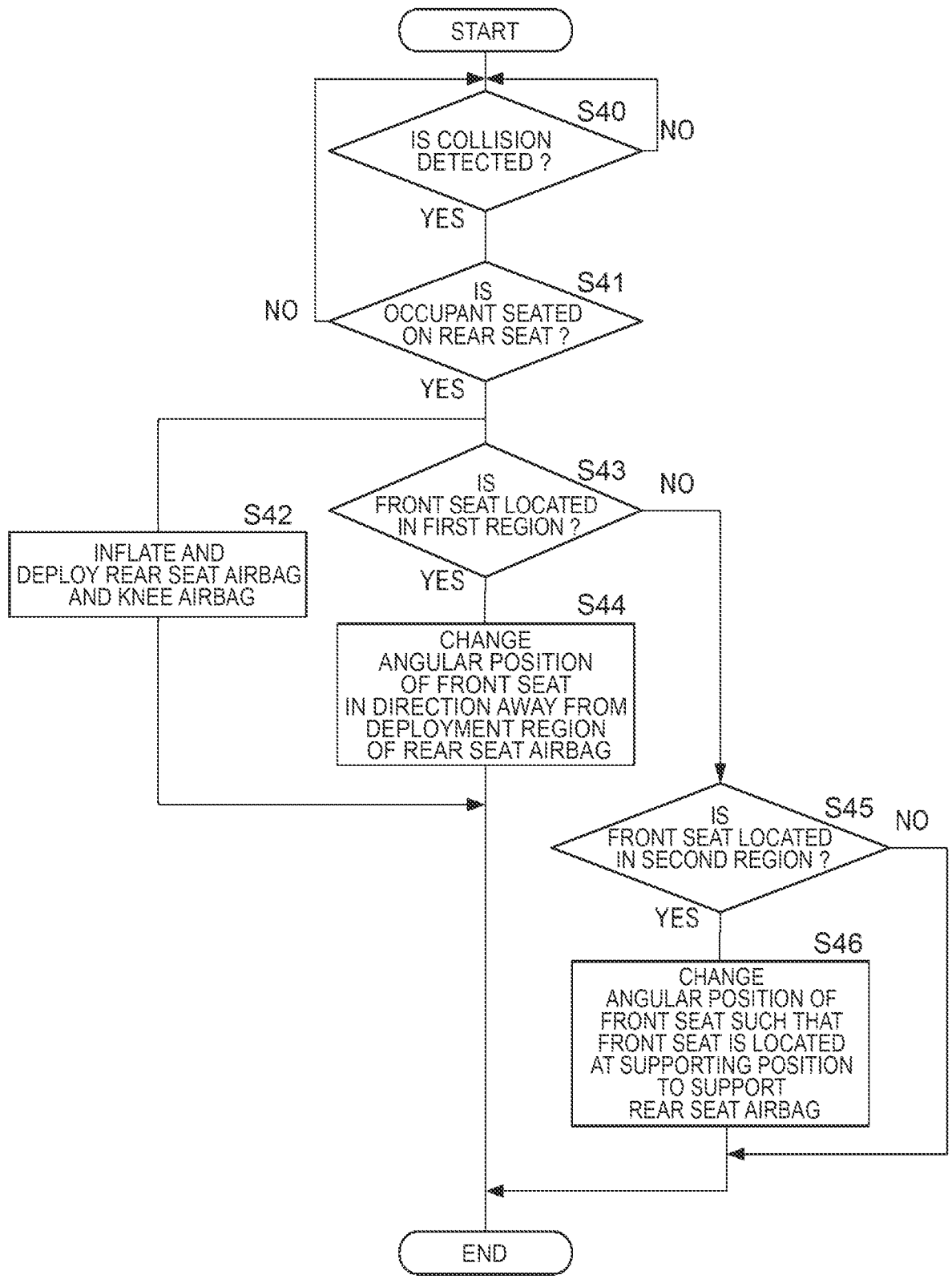

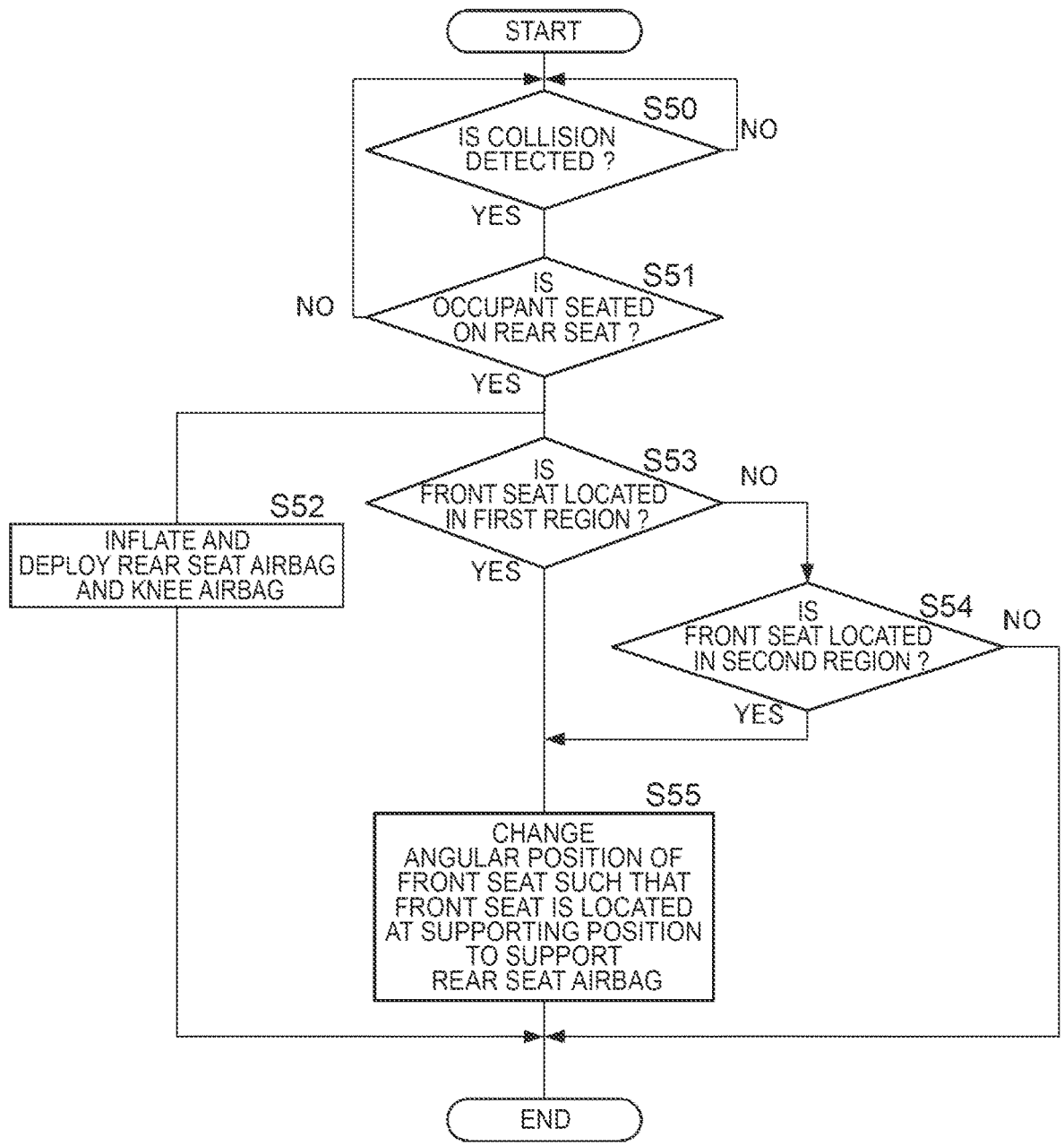

VEHICLE OCCUPANT RESTRAINT SYSTEM

CROSS-REFERENCE TO RELATED APPLICATION

This application claims priority to Japanese Patent Application No. 2020-146331 filed on Aug. 31, 2020, incorporated herein by reference in its entirety.

BACKGROUND

1. Technical Field

The disclosure relates to a vehicle occupant restraint system.

2. Description of Related Art

Japanese Unexamined Patent Application Publication No. 2016-030546 (JP 2016-030546 A) describes a rear seat airbag capable of inflating from a roof of a vehicle cabin. The rear seat airbag includes a first bag portion and a second bag portion. The first bag portion deploys downward in front of a rear seat from the roof. The second bag portion supports the deployed first bag portion when the first bag portion is inflated and deployed, and contacts with a headrest. With the rear seat airbag described in JP 2016-030546 A, the second bag portion suppresses the pivotal movement of the first bag portion toward the front of a vehicle during impact absorption, so a rear seat occupant is reliably protected.

SUMMARY

On the other hand, when the position and angular position of each seat can be freely changed to, for example, conform to the body shape of an occupant or allow an occupant to sit at a comfortable angle during autonomous driving, a front seat and a rear seat airbag may interfere with each other. In JP 2016-030546 A, when the position and angular position of each seat can be freely changed, the positional relation between the seat and the airbag changes depending on the position of the seat, so the time to start restraint of the airbag changes. For this reason, depending on the time to start restraint of the airbag, the second bag portion may not be able to sufficiently support the first bag portion.

The disclosure provides a vehicle occupant restraint system capable of appropriately controlling the positional relation between a seat and an airbag.

An aspect of the disclosure relates to a vehicle occupant restraint system. The vehicle occupant restraint system includes an airbag configured to deploy downward into a vehicle cabin from a roof of the vehicle cabin by receiving gas supplied, a region setting unit configured to set a predetermined region according to a position of the airbag, a collision sensor configured to detect a collision of a vehicle, a seat position detection sensor configured to detect at least one of a position and an angular position of a seat on which an occupant is seated, and a seat control unit configured to, when the collision sensor detects a collision of the vehicle and the seat position detection sensor detects that the seat is located in the predetermined region, execute control to change at least one of the position and the angular position of the seat.

With the vehicle occupant restraint system according to the above aspect, the region setting unit sets a predetermined region according to the position of the airbag, and the seat control unit executes control to change at least one of the position and the angular position of the seat when the collision sensor detects a collision of the vehicle and the seat position detection sensor detects that the seat is located in the set predetermined region. Therefore, at least one of the position and the angular position of the seat is changed according to the position of the airbag at the time of a collision of the vehicle, so the positional relation between the seat and the airbag is appropriately controlled.

In the vehicle occupant restraint system according to the aspect of the disclosure, the region setting unit may be configured to set a first region around a deployment region of the airbag, and the seat control unit may be configured to, when the collision sensor detects a collision of the vehicle and the seat position detection sensor detects that the seat is located within the first region, execute control to change at least one of the position and the angular position of the seat such that the seat is located away from the deployment region of the airbag.

With the vehicle occupant restraint system according to the above aspect, when the seat is located in the first region, that is, around the deployment region of the airbag, at the time of a collision of the vehicle, at least one of the position and the angular position of the seat is changed in a direction away from the deployment region of the airbag, so interference between the seat and the airbag is reduced.

In the vehicle occupant restraint system according to the aspect of the disclosure, the seat control unit may be configured to execute the control such that the seat is located at a supporting position to support the airbag.

With the vehicle occupant restraint system according to the above aspect, when the seat is located in the first region, that is, around the deployment region of the airbag, at the time of a collision of the vehicle, at least one of the position and the angular position of the seat is changed in a direction away from the deployment region of the airbag such that the seat is located at the supporting position to support the airbag. Therefore, interference between the seat and the airbag is reduced, and the airbag is stably supported by the seat irrespective of seat layout.

In the vehicle occupant restraint system according to the aspect of the disclosure, the region setting unit may be configured to set a first region around a deployment region of the airbag, and the seat control unit may be configured to, when the collision sensor detects a collision of the vehicle and the seat position detection sensor detects that the seat is located in the first region, execute control to change at least one of the position and the angular position of the seat such that the seat is located at a supporting position to support the airbag.

With the vehicle occupant restraint system according to the above aspect, when the seat is located in the first region, that is, around the deployment region of the airbag, at the time of a collision of the vehicle, at least one of the position and the angular position of the seat is changed such that the seat is located at the supporting position to support the airbag. Therefore, the airbag is stably supported by the seat irrespective of seat layout.

In the vehicle occupant restraint system according to the aspect of the disclosure, the region setting unit may be configured to set a second region spaced apart from a deployment region of the airbag, and the seat control unit may be configured to, when the collision sensor detects a collision of the vehicle and the seat position detection sensor detects that the seat is located in the second region, execute control to change at least one of the position and the angular position of the seat such that the seat is located at a supporting position to support the airbag.

With the vehicle occupant restraint system according to the above aspect, when the seat is located in the second region, that is, a region spaced apart from the deployment region of the airbag, at the time of a collision of the vehicle, at least one of the position and the angular position of the seat is changed such that the seat is located at the supporting position to support the airbag. Therefore, the airbag is stably supported by the seat irrespective of seat layout.

In the vehicle occupant restraint system according to the aspect of the disclosure, the seat may include a headrest having a retractable mechanism, and the seat control unit may be configured to execute control to position the seat at a supporting position to support the airbag by controlling the retractable mechanism of the headrest.

With the vehicle occupant restraint system according to the aspect of the disclosure, the seat includes the headrest having the retractable mechanism, and the seat control unit executes control to position the seat at the supporting position to support the airbag by controlling the retractable mechanism of the headrest. Therefore, even when, for example, the position of the seat and the position of the airbag are away from each other, the headrest is positioned at the supporting position to support the airbag by extending the headrest. Hence, the airbag is stably supported by the seat irrespective of seat layout.

In the vehicle occupant restraint system according to the aspect of the disclosure, the seat control unit may be configured to execute the control in a state where the vehicle is being driven autonomously.

With the vehicle occupant restraint system according to the aspect of the disclosure, the seat control unit executes control to change at least one of the position and the angular position of the seat in a state where the vehicle is being driven autonomously. Therefore, even when the flexibility of seat layout is increased during autonomous driving, an occupant is appropriately protected by the airbag.

As described above, with the vehicle occupant restraint system according to the aspect of the disclosure, it is advantageous in that the positional relation between the seat and the airbag is appropriately controlled.

With the vehicle occupant restraint system according to the aspect of the disclosure, it is advantageous in that interference between the seat and the airbag is reduced.

With the vehicle occupant restraint system according to the aspect of the disclosure, it is advantageous in that interference between the seat and the airbag is reduced and the airbag is stably supported by the seat irrespective of seat layout.

With the vehicle occupant restraint system according to the aspect of the disclosure, it is advantageous in that the airbag is stably supported by the seat irrespective of seat layout.

With the vehicle occupant restraint system according to the aspect of the disclosure, even when, for example, the position of the seat and the position of the airbag are away from each other, the headrest is positioned at the supporting position to support the airbag by extending the headrest. Therefore, it is advantageous in that the airbag is stably supported by the seat irrespective of seat layout.

With the vehicle occupant restraint system according to the aspect of the disclosure, it is advantageous in that, even when the flexibility of seat layout is increased during autonomous driving, an occupant is appropriately protected by the airbag.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart showing vehicle occupant restraint control according to the third embodiment;

FIG. 8 is a flowchart showing vehicle occupant restraint control according to a fourth embodiment; and FIG. 9 is a flowchart showing vehicle occupant restraint control according to a fifth embodiment.

DETAILED DESCRIPTION OF EMBODIMENTS

First Embodiment

Figure 1:
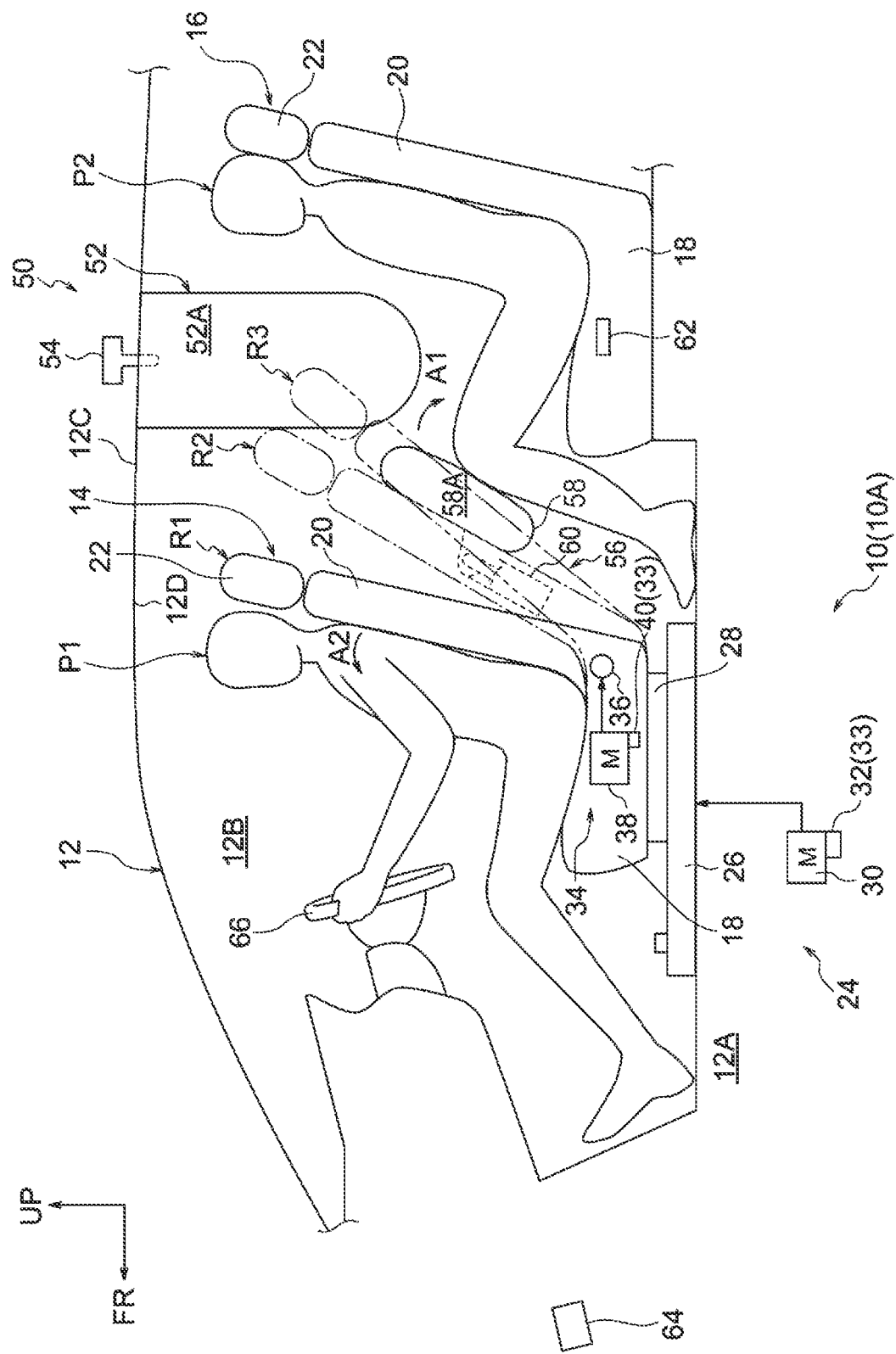
FIG. 1 is a side view showing a vehicle to which a vehicle occupant restraint system according to a first embodiment is applied.

A vehicle occupant restraint system 10 according to a first embodiment of the disclosure will be described. Initially, a vehicle 12 to which the vehicle occupant restraint system 10 according to the first embodiment is applied will be described with reference to FIG. 1. FIG. 1 is a side view showing the vehicle 12 to which the vehicle occupant restraint system 10 according to the first embodiment is applied. The vehicle 12 to which the vehicle occupant restraint system 10 according to the first embodiment is applied is an autonomous driving vehicle and does not need driving of a driver during autonomous driving. The arrow FR and the arrow UP shown in the drawings as needed respectively indicate the front side and the upper side of the vehicle 12. Hereinafter, when described by simply using front and rear, up and down, and right and left directions, these directions respectively mean front and rear in a vehicle front and rear direction, up and down in a vehicle up and down direction, and right and left when oriented in the vehicle forward direction unless otherwise specified.

As shown in FIG. 1, the vehicle 12 to which the vehicle occupant restraint system 10 according to the first embodiment is applied is a two-row seat vehicle and is provided with a front seat 14 and a rear seat 16. Each of the front seat 14 and the rear seat 16 is made up of a seat cushion 18 and a seat back 20. The seat cushion 18 is able to support the buttocks and thighs of a front seat occupant P1 or a rear seat occupant P2 from the seat lower side. The seat back 20 is coupled to the rear end of the seat cushion 18 and is able to support the back of the occupant P1 or the occupant P2. A headrest 22 is provided at the upper end of the seat back 20. The headrest 22 is able to support the head of the occupant P1 or the occupant P2.

The seat cushion 18 is made up of a frame, a cushion material, and a skin material. The frame forms the framework of the seat cushion 18. The cushion material is made from urethane foam. The skin material is made of fabric or leather and covers the surface of the cushion material. The front seat 14 is provided with a seat slide portion 24 that enables the seat cushion 18 to slide in the vehicle front and rear direction.

The seat slide portion 24 includes a seat rail 26 and an upper rail 28. The seat rail 26 is secured to a floor 12A of the vehicle 12. The upper rail 28 is slidable with respect to the seat rail 26 to which the front seat 14 is attached. The seat rail 26 and the upper rail 28 each are a pair of right and left rails extending in the vehicle front and rear direction. The seat slide portion 24 includes a transmission shaft (not shown), a slide motor 30, and a seat control unit 104 (described later). The transmission shaft bridges the pair of right and left rails of the upper rail 28. The slide motor 30 drives the transmission shaft for rotation. The seat control unit 104 controls the rotation drive of the slide motor 30. The upper rail 28 slides in the vehicle front and rear direction based on the driving force of the slide motor 30, transmitted via the transmission shaft.

In the first embodiment, a position sensor 32 is provided. The position sensor 32 detects the position of the front seat 14 in the vehicle front and rear direction. The position sensor 32 is a rotary encoder that detects the rotation position of the output shaft of the slide motor 30. As described above, the upper rail 28, that is, the front seat 14, is caused to slide in the vehicle front and rear direction by the driving force of the slide motor 30. Therefore, the amount of movement of the front seat 14 in the vehicle front and rear direction is indirectly detected by detecting the rotation position of the output shaft of the slide motor 30. The rotation position of the output shaft of the slide motor 30, that is, an electrical signal corresponding to the amount of movement of the front seat 14, is output from the position sensor 32.

Although not shown in the drawing, the front seat 14 may be provided with a lift device to lift or lower the seat cushion 18 in the vehicle up and down direction.

The seat back 20 is made up of a frame, a cushion material, and a skin material. The frame forms the framework of the seat back 20. The cushion material is made from urethane foam. The skin material is made of fabric or leather and covers the surface of the cushion material. The seat back 20 includes a reclining portion 34 to pivot the seat back 20 in the vehicle front and rear direction about the vehicle lower-side end of the seat back 20.

The reclining portion 34 includes a shaft 36. The central axis direction of the shaft 36 is set to a vehicle width direction. The vehicle rear-side portion of the frame of the seat cushion 18 and the vehicle lower-side portion of the frame of the seat back 20 are mechanically coupled by the shaft 36. The seat back 20 is able to pivot in the vehicle front and rear direction (the arrow A2 direction and the opposite arrow A1 direction in FIG. 1) about the shaft 36.

The reclining portion 34 includes a reclining motor 38 and the seat control unit 104 (described later). The seat control unit 104 controls the rotation drive of the reclining motor 38. The reclining motor 38 is provided in, for example, the seat cushion 18. The output shaft of the reclining motor 38 is coupled to, for example, a reduction gear provided on the shaft 36 or a gear train (not shown) serving as a driving force transmission device. The seat back 20 is pivoted around the shaft 36 by the driving force of the reclining motor 38. In the first embodiment, an angular position sensor 40 is provided. The angular position sensor 40 detects the reclining angle of the seat back 20 of the front seat 14, that is, the angular position of the seat back 20.

The angular position sensor 40 is, for example, a rotary encoder. The rotary encoder detects the rotation position of the output shaft of the reclining motor 38. As described above, the seat back 20 is pivoted in the vehicle front and rear direction by the driving force of the reclining motor 38. Therefore, the pivot angle, that is, the angular position, of the seat back 20 in the vehicle front and rear direction is indirectly detected by detecting the rotation position of the output shaft of the reclining motor 38. The rotation position of the output shaft of the reclining motor 38, that is, an electrical signal corresponding to the pivot angle (angular position) of the seat back 20, is output from the angular position sensor 40.

The headrest 22 is provided at the seat upper end of the seat back 20. The headrest 22 is made up of a cushion material and a skin material. The cushion material is made from urethane foam. The skin material is made of fabric or leather and covers the surface of the cushion material.

The vehicle 12 of the first embodiment includes a rear seat airbag system 50 for protecting the occupant P2 seated on the rear seat 16. The rear seat airbag system 50 is made up of a rear seat airbag 52, a first inflator 54, and an inflator control unit 106 (described later). The rear seat airbag 52 serves as an airbag. The first inflator 54 supplies gas to the rear seat airbag 52. The inflator control unit 106 controls the activation of the first inflator 54. At the time of a collision of the vehicle 12, the rear seat airbag 52 inflates and deploys downward into a vehicle cabin 12B from a roof 12C of the vehicle cabin 12B between the front seat 14 and the rear seat 16 by receiving gas supplied from the first inflator 54. FIG. 1 shows the state where the rear seat airbag 52 is inflated and deployed.

The rear seat airbag 52 before being inflated and deployed is accommodated in a folded state between the roof 12C and a roof lining 12D covering the vehicle cabin side of the roof 12C. The first inflator 54 is also similarly accommodated between the roof 12C and the roof lining 12D.

The vehicle 12 of the first embodiment includes a rear seat knee airbag system 56 for protecting the occupant P2 seated on the rear seat 16. The rear seat knee airbag system 56 is made up of a knee airbag 58, a second inflator 60, and an inflator control unit 106 (described later). The second inflator 60 supplies gas to the knee airbag 58. The inflator control unit 106 controls the activation of the second inflator 60. At the time of a collision of the vehicle 12, the knee airbag 58 inflates and deploys toward the rear seat 16 from the seat back 20 of the front seat 14 between the front seat 14 and the rear seat 16 by receiving gas supplied from the second inflator 60. FIG. 1 shows the state where the knee airbag 58 is inflated and deployed.

The knee airbag 58 before being inflated and deployed is accommodated in a folded state inside the seat back 20 of the front seat 14. The second inflator 60 is also similarly accommodated inside the seat back 20 of the front seat 14.

A seating sensor 62 is provided in the seat cushion 18 of the rear seat 16. The seating sensor 62 detects seating of the occupant P2 on the seat cushion 18. The seating sensor 62 is specifically a sensor that detects the seating pressure on the seat cushion 18 and is made up of one or multiple pressure-sensitive sensors.

The vehicle 12 is provided with a collision sensor 64. The collision sensor 64 detects a collision of the vehicle 12. The collision sensor 64 is made up of stereo cameras (not shown) respectively provided at, for example, the upper areas of a windshield and a rear window around the center in the vehicle width direction. The collision sensor 64 detects a collision object that will collide with the vehicle 12 by taking images ahead and behind the vehicle 12 with the stereo cameras.

A collision prediction sensor, such as a precrash sensor, is used as an example of the collision sensor 64 provided on the windshield in the first embodiment. It is predictable that various collision configurations of the vehicle 12 will occur or are unavoidable based on a signal from the collision sensor 64. A distance to the collision object detected by the stereo cameras, a relative speed between the vehicle 12 and the collision object, and other data are measured, and the measured data is output to an ECU 100 (described later). The ECU 100 determines whether a collision of the vehicle 12 is unavoidable based on the measured data from the stereo cameras. The collision sensor 64 may be made up of a millimeter-wave radar or the like. A collision configuration to be detected by the collision prediction sensor is a frontal collision and includes a head-on collision, a small overlap collision, an oblique collision, and the like. Here, a small overlap collision is, for example, a collision on the outer side of a front side member (not shown) of a vehicle in the vehicle width direction. An oblique collision is a collision from an obliquely forward to a vehicle front.

Although not shown in the drawing, the vehicle 12 of the first embodiment is provided with a seatbelt system at each of the front seat 14 and the rear seat 16. A known system may be used as the seatbelt system. In the seatbelt system, when it is determined that a collision of the vehicle 12 is unavoidable based on a signal from the collision sensor 64, a seatbelt is wound by a pretensioner of the seatbelt system to restrain the occupant P1 or the occupant P2.

As shown in FIG. 1, the front seat 14 of the first embodiment is a seat provided as a driver seat of a right-hand drive vehicle, and a steering wheel 66 is provided in front of the front seat 14. When the occupant P1 that is a driver grips the steering wheel 66 and steers to the right or left, the vehicle 12 is turned to the right or left. When an autonomous driving mode is selected, the vehicle 12 is automatically turned to the right or left following a road even when the occupant P1 does not operate the steering wheel 66.

Figure 2:
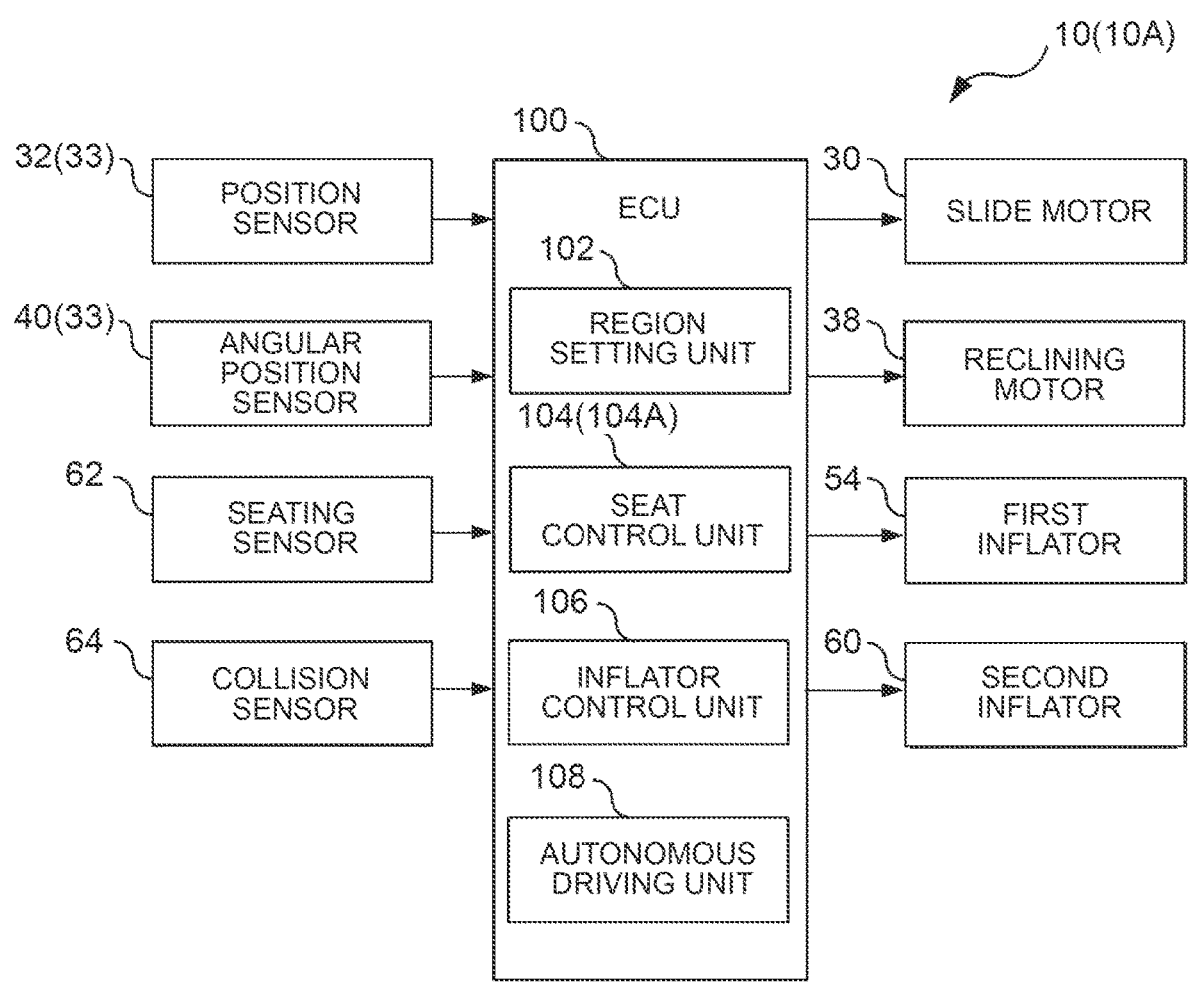
FIG. 2 is a block diagram showing the hardware configuration of the vehicle occupant restraint system according to the first embodiment.

FIG. 2 is a block diagram showing the hardware configuration of the vehicle occupant restraint system 10 according to the first embodiment. As shown in FIG. 2, the vehicle occupant restraint system 10 includes the electronic control unit (ECU) 100 as a control unit. The ECU 100 is a central processing unit. The ECU 100 runs various programs and controls various units. The ECU 100 of the first embodiment is made up of a central processing unit (CPU: processor), a read only memory (ROM), a random access memory (RAM), a storage, and the like (not shown). These components are connected to one another via a bus so as to be able to communicate with one another. The CPU reads a program from the ROM or the storage and runs the program by using the RAM as a work area.

The position sensor 32, the angular position sensor 40, the seating sensor 62, the collision sensor 64, the slide motor 30, the reclining motor 38, the first inflator 54, the second inflator 60, the pretensioner (not shown), and the like are electrically connected to the ECU 100. Output values output from the position sensor 32, the angular position sensor 40, the seating sensor 62, and the collision sensor 64 are input to the ECU 100. In the first embodiment, the position sensor 32 and the angular position sensor 40 may be regarded as a seat position detection sensor 33 according to the aspect of the disclosure.

As shown in FIG. 2, the ECU 100 functions as a region setting unit 102, the seat control unit 104, the inflator control unit 106, and an autonomous driving unit 108. The functional components are implemented by the CPU of the ECU 100 reading and running programs stored in the ROM or the storage.

The region setting unit 102 sets a predetermined region according to the position of the rear seat airbag 52. In the first embodiment, a first region is set around a deployment region 52A where the rear seat airbag 52 is inflated and deployed. Specifically, the range of a value corresponding to the first region is set for each of an output value output from the position sensor 32 and an output value output from the angular position sensor 40. All combinations of the value of the position sensor 32 and the value of the angular position sensor 40, at which at least part of the front seat 14 can be present in the first region, are defined as values corresponding to the first region.

When the collision sensor 64 detects a collision of the vehicle 12 and the seat position detection sensor 33 detects that the front seat 14 is located in the first region, the seat control unit 104 executes control to change at least one of the position and the angular position of the front seat 14.

For example, the reclining angle of the seat back 20, that is, the angular position of the seat back 20, represented by the continuous line at the position of the front seat 14 in the vehicle front and rear direction, that is, the position of the upper rail 28, shown in FIG. 1 is defined as a driving angular position R1. The reclining angle of the seat back 20, that is, the angular position of the seat back 20, represented by the alternate long and short dashed line, is defined as a slightly comfortable angular position R2 that is an angular position at which the seat back 20 is reclined more than the seat back 20 at the driving angular position R1. The reclining angle of the seat back 20, that is, the angular position of the seat back 20, represented by the alternate long and two-short dashed line, is defined as a highly comfortable angular position R3 that is an angular position at which the seat back 20 is reclined more than the seat back 20 at the slightly comfortable angular position R2.

In the first embodiment, the vehicle 12 is an autonomous driving vehicle and does not need driving of a driver in a state where the vehicle 12 is being driven autonomously. Therefore, the occupant P1 that is the driver does not need to operate the steering wheel 66 during autonomous driving, so the occupant P1 may set the seat back 20 to the slightly comfortable angular position R2 or the highly comfortable angular position R3. In the state shown in FIG. 1, when the seat back 20 of the front seat 14 is at the highly comfortable angular position R3, values respectively output from the position sensor 32 and the angular position sensor 40 become values corresponding to the first region.

When the collision sensor 64 detects a collision of the vehicle 12 and the seat position detection sensor 33 detects that the front seat 14 is located in the first region, that is, values respectively output from the position sensor 32 and the angular position sensor 40 are values corresponding to the first region, the seat control unit 104 executes control to change the angular position of the seat back 20 such that the front seat 14 is located away from the deployment region 52A of the rear seat airbag 52.

Specifically, when, for example, the seat back 20 is at the highly comfortable angular position R3, the seat control unit 104 derives the rotation amount of the reclining motor 38 such that the seat back 20 is set at the driving angular position R1 and rotates the reclining motor 38 by the derived rotation amount.

When the collision sensor 64 detects a collision of the vehicle 12, the inflator control unit 106 derives the amount of gas to be supplied from the first inflator 54 to the rear seat airbag 52 and the amount of gas to be supplied from the second inflator 60 to the knee airbag 58 and causes the first inflator 54 and the second inflator 60 to respectively supply the derived amounts of gas to the rear seat airbag 52 and the knee airbag 58.

The autonomous driving unit 108 autonomously drives the vehicle 12 when the autonomous driving mode is selected. A known technology may be used as the autonomous driving unit 108. In the first embodiment, the seat control unit 104 executes seat control as described above in a state where the vehicle 12 is being driven autonomously by the autonomous driving unit 108.

Figure 3:
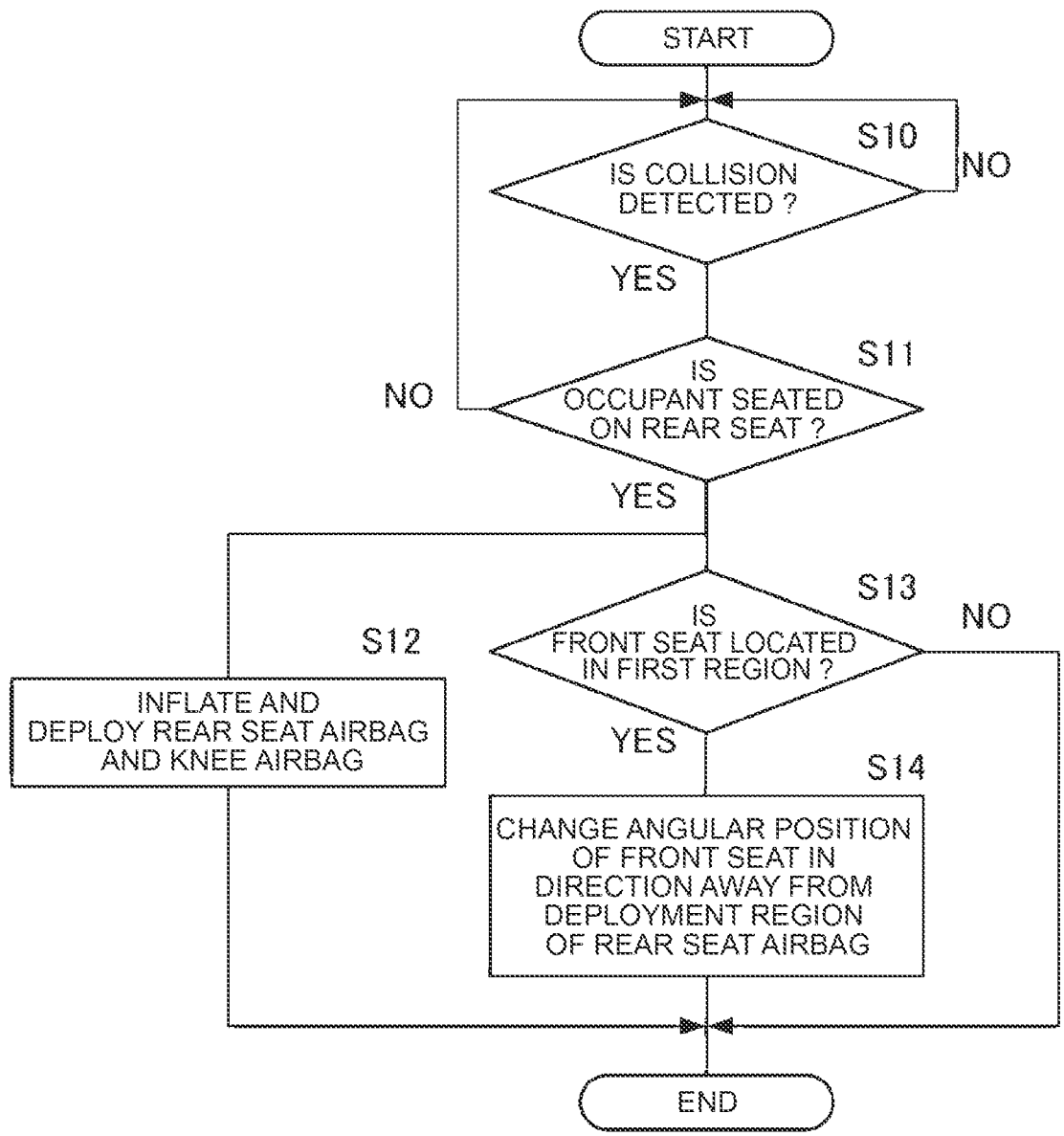
FIG. 3 is a flowchart showing vehicle occupant restraint control according to the first embodiment.

Next, the flow of an occupant restraint control process to be executed by the vehicle occupant restraint system 10 will be described with reference to the flowchart of FIG. 3. In the vehicle occupant restraint system 10 according to the first embodiment, as shown in FIG. 3, when the ECU 100 determines that a collision of the vehicle 12 is detected in accordance with a detection signal of the collision sensor 64 (YES in step S10), the ECU 100 determines whether the occupant P2 is seated on the rear seat 16 in accordance with a detection signal of the seating sensor 62. When the ECU 100 determines that the occupant P2 is seated on the rear seat 16 (YES in step S11), the ECU 100 executes occupant restraint control.

Specifically, the inflator control unit 106 inflates and deploys the rear seat airbag 52 and the knee airbag 58 by causing the first inflator 54 and the second inflator 60 to respectively supply gas to the rear seat airbag 52 and the knee airbag 58 based on the derived amounts of gas (step S12).

The ECU 100 determines whether at least part of the front seat 14 is located in the first region based on output signals from the position sensor 32 and the angular position sensor 40, that is, the seat position detection sensor 33, in parallel with the process of step S12. When the ECU 100 determines that at least part of the front seat 14 is located in the first region (YES in step S13), the seat control unit 104 changes the angular position of the seat back 20 of the front seat 14 in a direction away from the deployment region 52A of the rear seat airbag 52 (step S14).

Specifically, when the collision sensor 64 detects a collision of the vehicle 12 and the position sensor 32 and the angular position sensor 40 detect that the front seat 14 is located in the first region, the seat control unit 104 executes control to change the angular position of the seat back 20 such that the front seat 14 is located away from the deployment region 52A of the rear seat airbag 52.

In the first embodiment, when, for example, the seat back 20 is at the highly comfortable angular position R3, the seat control unit 104 derives the rotation amount of the reclining motor 38 such that the seat back 20 is set at the driving angular position R1 and rotates the reclining motor 38 by the derived rotation amount.

When the processes of step S12 and step S14 are executed, the ECU 100 ends the process of occupant restraint control. Also, when the ECU 100 determines in step S13 that the front seat 14 is not located in the first region (NO in step S13), the ECU 100 ends the process of occupant restraint control.

On the other hand, when the ECU 100 determines in step S10 that a collision of the vehicle 12 is not detected (NO in step S10), the ECU 100 does not execute occupant restraint control until a collision of the vehicle 12 is detected, and repeatedly executes the process of step S10. When the ECU 100 determines in step S11 that no occupant P2 is seated on the rear seat 16 (NO in step S11), the ECU 100 advances the process to step S10, subsequently does not execute occupant restraint control until a collision of the vehicle 12 is detected, and repeatedly executes the process of step S10.

Operation

Next, the operation and advantageous effects of the first embodiment will be described.

In the vehicle occupant restraint system 10 according to the first embodiment, the region setting unit 102 sets a predetermined region according to the position of the rear seat airbag 52, and, when the collision sensor 64 detects a collision of the vehicle 12 and the seat position detection sensor 33 detects that the front seat 14 is located in the set predetermined region, the seat control unit 104 executes control to change at least one of the position and the angular position of the front seat 14. Therefore, at the time of a collision of the vehicle 12, the angular position of the seat back 20 of the front seat 14 is changed according to the position of the rear seat airbag 52, so the positional relation between the front seat 14 and the rear seat airbag 52 is appropriately controlled.

With the vehicle occupant restraint system 10 according to the first embodiment, at the time of a collision of the vehicle 12, when the front seat 14 is located in the first region, that is, around the deployment region 52A of the rear seat airbag 52, the angular position of the seat back 20 of the front seat 14 is changed from the highly comfortable angular position R3 to the driving angular position R1, that is, in a direction away from the deployment region 52A of the rear seat airbag 52. Therefore, interference between the front seat 14 and the rear seat airbag 52 is reduced.

In the first embodiment, the seat control unit 104 executes control to change the angular position of the seat back 20 of the front seat 14 from the highly comfortable angular position R3 to the driving angular position R1; however, the disclosure is not limited thereto. As long as the front seat 14 is located away from the deployment region 52A of the rear seat airbag 52, the seat control unit 104 may, for example, execute control to move the seat cushion 18 of the front seat 14 in the vehicle forward direction without changing the angular position of the seat back 20 of the front seat 14. Alternatively, the seat control unit 104 may execute control to move the seat cushion 18 of the front seat 14 in the vehicle forward direction without moving the angular position of the seat back 20 of the front seat 14 in the arrow A2 direction in FIG. 1.

In the first embodiment, at least one of the position and the angular position of the front seat 14 is changed by the seat control unit 104 such that the front seat 14 is located away from the deployment region 52A of the rear seat airbag 52. At this time, when the front seat 14 is located too far away from the deployment region 52A of the rear seat airbag 52, the inflator control unit 106 may inflate and deploy the rear seat airbag 52 by increasing the amount of gas to be supplied to the rear seat airbag 52 and supplying gas from the first inflator 54 to the rear seat airbag 52 based on the increased amount of gas. The amount of gas is increased as the front seat 14 is distanced from the deployment region 52A of the rear seat airbag 52.

Thus, a distance between the rear seat airbag 52 and both the seat back 20 and the headrest 22 is appropriately compensated, so the occupant P2 seated on the rear seat 16 can be stably restrained by the rear seat airbag 52.

When the seat back 20 of the front seat 14 is excessively located away from the legs of the occupant P2 seated on the rear seat 16, the inflator control unit 106 may inflate and deploy the knee airbag 58 by increasing the amount of gas to be supplied to the knee airbag 58 and supplying gas from the second inflator 60 to the knee airbag 58 based on the increased amount of gas. The amount of gas is increased as the front seat 14 is distanced from the occupant P2 seated on the rear seat 16.

Thus, a distance between the knee airbag 58 and the legs of the occupant P2 seated on the rear seat 16 is appropriately compensated, so impact on the legs of the occupant P2 seated on the rear seat 16 is reduced by the knee airbag 58.

When, for example, a value output from the angular position sensor 40 becomes a value at which at least part of the front seat 14 is located in the first region while the angular position of the seat back 20 of the front seat 14 is the slightly comfortable angular position R2 in FIG. 1, the seat control unit 104 executes control to change the angular position of the seat back 20 of the front seat 14 from the slightly comfortable angular position R2 to the driving angular position R1.

Modification of First Embodiment

Next, a modification of the first embodiment will be described. The configurations of the vehicle occupant restraint system 10 and the vehicle 12 are the same as those of FIG. 1, so only the difference will be described below. In the first embodiment, the seat control unit 104 executes control to change the angular position of the seat back 20 of the front seat 14 from the highly comfortable angular position R3 to the driving angular position R1. In this modification, the seat control unit 104 executes control to change the angular position of the seat back 20 of the front seat 14 from the highly comfortable angular position R3 to the slightly comfortable angular position R2. In this modification, when the angular position of the seat back 20 of the front seat 14 is the slightly comfortable angular position R2, a value output from the angular position sensor 40 is not a value at which at least part of the front seat 14 is located in the first region.

In this modification, the state where the angular position of the seat back 20 of the front seat 14 is the slightly comfortable angular position R2 as shown in FIG. 1 is defined as a supporting position at which the front seat 14 supports the rear seat airbag 52. In other words the seat control unit 104 executes control to change the angular position of the seat back 20 of the front seat 14 such that the front seat 14 is located at the supporting position to support the rear seat airbag 52.

Operation

Next, the operation and advantageous effects of the modification of the first embodiment will be described.

In the modification of the vehicle occupant restraint system 10 according to the first embodiment, at the time of a collision of the vehicle 12, when the front seat 14 is located in the first region, that is, around the deployment region 52A of the rear seat airbag 52, the angular position of the seat back 20 of the front seat 14 is changed from the highly comfortable angular position R3 to the slightly comfortable angular position R2. In other words, the angular position of the seat back 20 of the front seat 14 is changed in a direction away from the deployment region 52A of the rear seat airbag 52 so as to be located at the supporting position to support the rear seat airbag 52. Therefore, interference between the front seat 14 and the rear seat airbag 52 is reduced, and the rear seat airbag 52 is stably supported by the front seat 14 irrespective of seat layout.

In the modification, the seat control unit 104 executes control to change the angular position of the seat back 20 of the front seat 14 from the highly comfortable angular position R3 to the slightly comfortable angular position R2; however, the disclosure is not limited thereto. As long as the front seat 14 is located away from the deployment region 52A of the rear seat airbag 52 and is located at the supporting position to support the rear seat airbag 52, the seat control unit 104 may, for example, execute control to move the seat cushion 18 of the front seat 14 in the vehicle forward direction without changing the angular position of the seat back 20 of the front seat 14. Alternatively, the seat control unit 104 may execute control to move the seat cushion 18 of the front seat 14 in the vehicle forward direction without moving the angular position of the seat back 20 of the front seat 14 in the arrow A2 direction in FIG. 1.

Second Embodiment

A vehicle occupant restraint system 10A according to a second embodiment of the disclosure will be described. Initially, the vehicle 12 to which the vehicle occupant restraint system 10A according to the second embodiment is applied will be described. The configurations of the vehicle occupant restraint system 10A and the vehicle 12 are the same as those of the vehicle occupant restraint system 10 and the vehicle 12 shown in FIG. 1, so only the difference will be described below. In the first embodiment, at the time of a collision of the vehicle 12, when the front seat 14 is located in the first region, that is, around the deployment region 52A of the rear seat airbag 52, the seat control unit 104 changes at least one of the position and the angular position of the front seat 14 such that the front seat 14 is located away from the deployment region 52A of the rear seat airbag 52.

In the second embodiment, at the time of a collision of the vehicle 12, when the front seat 14 is located in the first region, that is, around the deployment region 52A of the rear seat airbag 52, a seat control unit 104A changes the angular position of the seat back 20 of the front seat 14 such that the front seat 14 is located at a supporting position to support the rear seat airbag 52. In the second embodiment, when the angular position of the seat back 20 of the front seat 14 is the slightly comfortable angular position R2 as shown in FIG. 1, the headrest 22 contacts with the deployment region 52A of the rear seat airbag 52, so the slightly comfortable angular position R2 is set as the supporting position at which the front seat 14 supports the rear seat airbag 52.

When, for example, the angular position of the seat back 20 of the front seat 14 is the driving angular position R1, the seat control unit 104A executes control to change the angular position of the seat back 20 in the arrow A1 direction to the slightly comfortable angular position R2. When, for example, the angular position of the seat back 20 of the front seat 14 is the highly comfortable angular position R3, the seat control unit 104A executes control to change the angular position of the seat back 20 in the arrow A2 direction to the slightly comfortable angular position R2.

Next, the flow of an occupant restraint control process to be executed by the vehicle occupant restraint system 10A will be described with reference to the flowchart of FIG. 4. The processes of step S20, step S21, step S22, and step S23 of the flowchart shown in FIG. 4 are the same as the processes of step S10, step S11, step S12, and step S13 of the flowchart of the first embodiment shown in FIG. 3, so the description will not be repeated, and only the process of step S24 that is a different process will be described.

Figure 4:
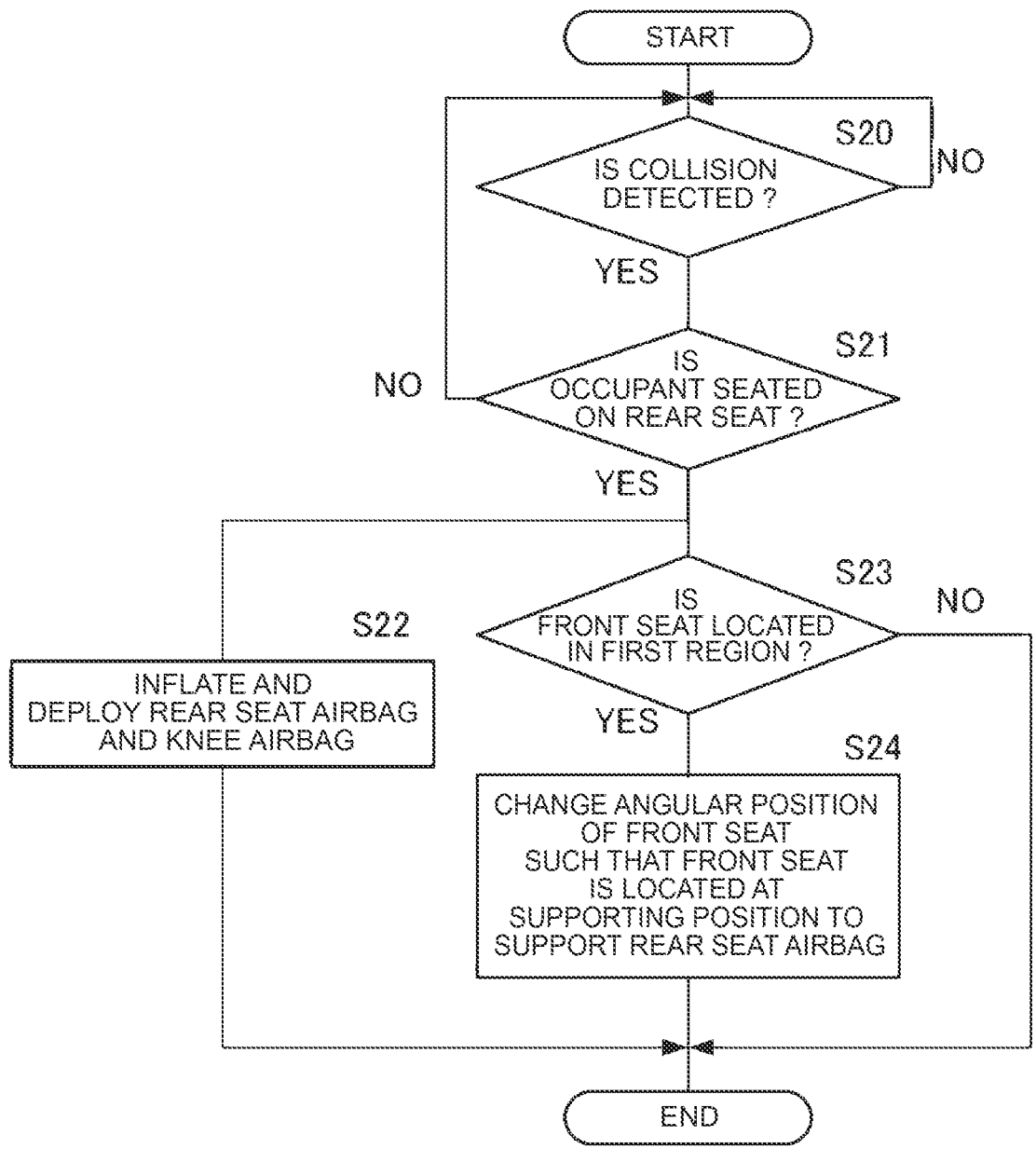
FIG. 4 is a flowchart showing vehicle occupant restraint control according to a second embodiment.

In the vehicle occupant restraint system 10A according to the second embodiment, as shown in FIG. 4, when the ECU 100 determines in step S24 that at least part of the front seat 14 is located in the first region (YES in step S23), the seat control unit 104A changes the angular position of the seat back 20 of the front seat 14 such that the front seat 14 is located at the supporting position to support the rear seat airbag 52 (step S24).

Specifically, when the collision sensor 64 detects a collision of the vehicle 12 and the position sensor 32 and the angular position sensor 40 detect that the front seat 14 is located within the first region, the seat control unit 104A executes control to change the angular position of the seat back 20 such that the front seat 14 is located at the supporting position to support the rear seat airbag 52, that is, to change the angular position of the seat back 20 to the slightly comfortable angular position R2.

Operation

Next, the operation and advantageous effects of the second embodiment will be described.

In the vehicle occupant restraint system 10A according to the second embodiment, at the time of a collision of the vehicle 12, when the front seat 14 is located in the first region, that is, around the deployment region 52A of the rear seat airbag 52, the angular position of the seat back 20 of the front seat 14 is changed such that the front seat 14 is located at the supporting position to support the rear seat airbag 52. Therefore, the rear seat airbag 52 is stably supported by the front seat 14 irrespective of seat layout.

In the second embodiment, the seat control unit 104A executes control to change the angular position of the seat back 20 of the front seat 14 from the highly comfortable angular position R3 or the driving angular position R1 to the slightly comfortable angular position R2; however, the disclosure is not limited thereto. As long as the headrest 22 is located at a position at which the headrest 22 contacts with the deployment region 52A of the rear seat airbag 52, the seat control unit 104A may, for example, execute control to move the seat cushion 18 of the front seat 14 in the vehicle front and rear direction without changing the angular position of the seat back 20 of the front seat 14. Alternatively, the seat control unit 104A may execute control to move the seat cushion 18 of the front seat 14 in the vehicle front and rear direction without moving the angular position of the seat back 20 of the front seat 14 in the arrow A1 or arrow A2 direction in FIG. 1.

In the second embodiment, at least one of the position and the angular position of the front seat 14 is changed by the seat control unit 104A such that the headrest 22 contacts with the deployment region 52A of the rear seat airbag 52. At this time, when the seat back 20 is located too far away from the legs of the occupant P2 seated on the rear seat 16, the inflator control unit 106 may inflate and deploy the knee airbag 58 by increasing the amount of gas to be supplied to the knee airbag 58 and supplying gas from the second inflator 60 to the knee airbag 58 based on the increased amount of gas. The amount of gas is increased as the seat back 20 is distanced from a deployment region 58A of the knee airbag 58.

Thus, a distance between the knee airbag 58 and the legs of the occupant P2 seated on the rear seat 16 is appropriately compensated, so impact on the legs of the occupant P2 seated on the rear seat 16 is reduced by the knee airbag 58.

Third Embodiment

Figure 5:
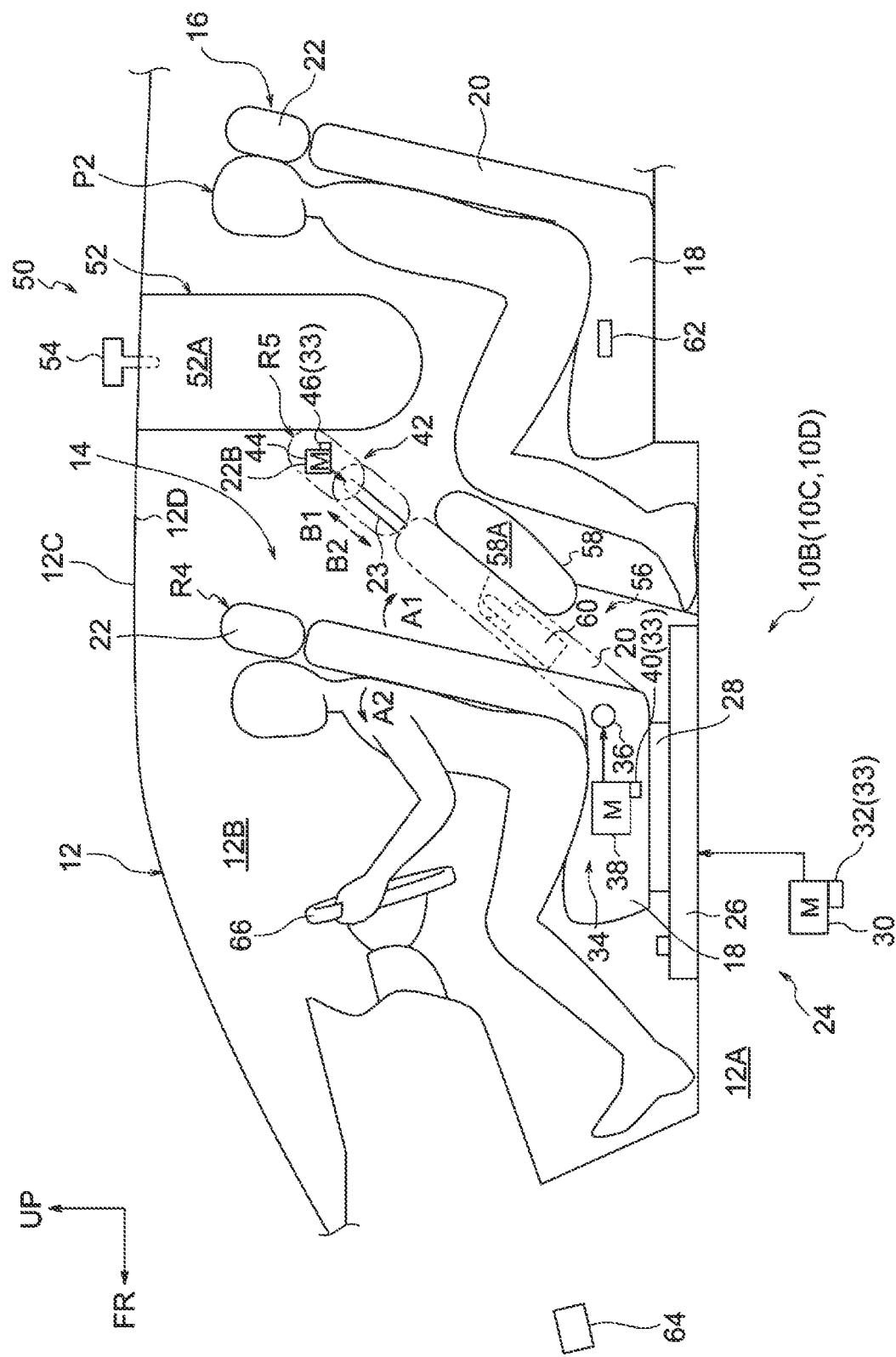
FIG. 5 is a side view showing a vehicle to which a vehicle occupant restraint system according to a third embodiment is applied.

A vehicle occupant restraint system 10B according to a third embodiment of the disclosure will be described. Initially, the vehicle 12 to which the vehicle occupant restraint system 10B according to the third embodiment is applied will be described with reference to FIG. 5. FIG. 5 is a side view showing the vehicle 12 to which the vehicle occupant restraint system 10B according to the third embodiment is applied. In the vehicle 12 shown in FIG. 5, like reference signs denote the same components as those of the first embodiment shown in FIG. 1, the description thereof will not be repeated, and only the difference will be described below.

A headrest 22B of the vehicle 12 to which the vehicle occupant restraint system 10B according to the third embodiment is applied includes a retractable mechanism 42. The headrest 22B is provided with a pair of right and left cylindrical holders (not shown) at an end adjacent to the seat back 20. As shown in FIG. 5, the headrest 22B is provided with a pair of right and left headrest stays 23 extending toward the seat lower side. The lower ends of the headrest stays 23 are fixed to the seat upper-side end of the seat back 20, and the upper ends of the headrest stays 23 are respectively inserted in the right and left cylindrical holders provided in the headrest 22B. The headrest 22B is slidable in a seat up and down direction of the seat back 20.

The retractable mechanism 42 is made up of the right and left cylindrical holders and the headrest stays 23 and couples the headrest stays 23 to the headrest 22B. The retractable mechanism 42 includes an extension motor 44, a gear (not shown), and the seat control unit 104. The headrest 22B is configured to slide in the seat up and down direction with respect to the headrest stays 23 by driving the extension motor 44 in the directions of arrows B1 and B2. The seat control unit 104 controls the rotation drive of the extension motor 44. In the third embodiment, a headrest position sensor 46 is provided. The headrest position sensor 46 detects the position of the headrest 22B in an extension direction.

The headrest position sensor 46 is, for example, a rotary encoder that detects the rotation position of the output shaft of the extension motor 44. As described above, the headrest 22B is caused to slide in the seat up and down direction of the seat back 20 by the driving force of the extension motor 44. Therefore, the amount of movement of the headrest 22B in the seat up and down direction is indirectly detected by detecting the rotation position of the output shaft of the extension motor 44. An electrical signal corresponding to the rotation position of the output shaft of the extension motor 44, that is, the amount of movement of the headrest 22B in the seat up and down direction, is output from the headrest position sensor 46.

Figure 6:
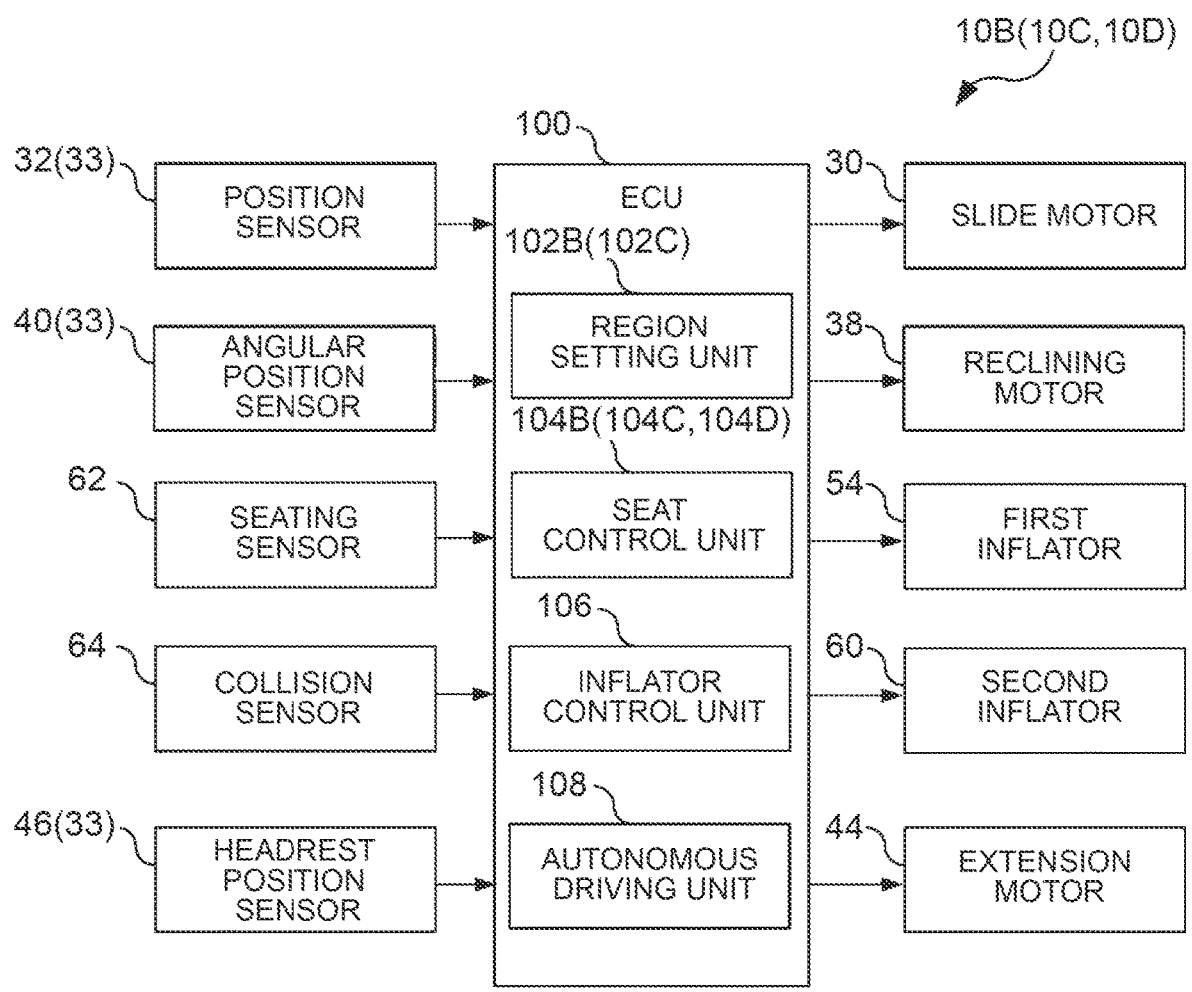
FIG. 6 is a block diagram showing the hardware configuration of the vehicle occupant restraint system according to the third embodiment.

FIG. 6 is a block diagram showing the hardware configuration of the vehicle occupant restraint system 10B according to the third embodiment. In the vehicle occupant restraint system 10B, in addition to the vehicle occupant restraint system 10 of the first embodiment shown in FIG. 2, the headrest position sensor 46 and the extension motor 44 are electrically connected to the ECU 100 as shown in FIG. 6. In the third embodiment, the position sensor 32, the angular position sensor 40, and the headrest position sensor 46 may be regarded as the seat position detection sensor 33 of the aspect of the disclosure.

A region setting unit 102B of the third embodiment sets a predetermined region according to the position of the rear seat airbag 52 and specifically sets a second region to a region spaced apart from the deployment region 52A where the rear seat airbag 52 is inflated and deployed. Specifically, the range of a value corresponding to the second region is set for each of an output value output from the position sensor 32, an output value output from the angular position sensor 40, and an output value output from the headrest position sensor 46. All combinations of the value of the position sensor 32, the value of the angular position sensor 40, and the value of the headrest position sensor 46, at which at least part of the front seat 14 can be present in the second region, are defined as values corresponding to the second region.

When the collision sensor 64 detects a collision of the vehicle 12 and the seat position detection sensor 33 detects that the front seat 14 is located in the second region, a seat control unit 104B of the third embodiment executes control to change at least one of the position and the angular position of the front seat 14.

For example, the reclining angle of the seat back 20, that is, the angular position of the seat back 20, represented by the continuous line at the position of the front seat 14 in the vehicle front and rear direction shown in FIG. 5 is defined as a driving angular position R4. The reclining angle of the seat back 20, that is, the angular position of the seat back 20, represented by the dashed line, is defined as a comfortable angular position R5 that is an angular position at which the seat back 20 is reclined more than the seat back 20 at the driving angular position R4. Here, the position of the front seat 14 in the vehicle front and rear direction, shown in FIG. 5, is located in the vehicle forward direction than the position of the front seat 14 in the vehicle front and rear direction, shown in FIG. 1. When, for example, the position of the front seat 14 shown in FIG. 1 is a position suitable for a driver with a standard body type, the position of the front seat 14 shown in FIG. 5 is a position suitable for a small driver.

In the third embodiment, in the state shown in FIG. 5, when the seat back 20 of the front seat 14 is at the driving angular position R4, values respectively output from the position sensor 32, the angular position sensor 40, and the headrest position sensor 46 become values corresponding to the second region.

In the state shown in FIG. 5, even when the seat control unit 104B reclines the seat back 20 in the arrow A1 direction by rotating the reclining motor 38, the headrest 22B cannot contact with the deployment region 52A of the rear seat airbag 52. Therefore, in the third embodiment, the seat control unit 104B executes control to extend the headrest 22B toward the deployment region 52A by rotating the extension motor 44.

Next, the flow of an occupant restraint control process to be executed by the vehicle occupant restraint system 10B will be described with reference to the flowchart of FIG. 7. The processes of step S30, step S31, and step S32 of the flowchart shown in FIG. 7 are the same as the processes of step S10, step S11, and step S12 of the flowchart of the first embodiment shown in FIG. 3, so the description will not be repeated, and only the processes of step S33 and step S34 that are different processes will be described.

In the vehicle occupant restraint system 10B according to the third embodiment, as shown in FIG. 7, the ECU 100 determines whether at least part of the front seat 14 is located in the second region based on output signals from the position sensor 32, the angular position sensor 40, and the headrest position sensor 46, that is, the seat position detection sensor 33, in parallel with the process of step S32. When the ECU 100 determines that at least part of the front seat 14 is located in the second region (YES in step S33), the seat control unit 104B changes the position of the front seat 14 such that the front seat 14 is located at the supporting position to support the rear seat airbag 52 (step S34).

Specifically, when the collision sensor 64 detects a collision of the vehicle 12 and the seat position detection sensor 33 detects that the front seat 14 is located within the second region, the seat control unit 104B executes control to change the angular position of the seat back 20 in a direction to approach the deployment region 52A of the rear seat airbag 52 (arrow A1 direction) and to extend the headrest 22B toward the deployment region 52A of the rear seat airbag 52.

In the third embodiment, when, for example, the seat back 20 is at the driving angular position R4, the seat control unit 104B derives the rotation amount of the reclining motor 38 such that the seat back 20 is set at the comfortable angular position R5 and rotates the reclining motor 38 by the derived rotation amount. In addition, the seat control unit 104B derives the rotation amount of the extension motor 44 by which the headrest 22B contacts with the deployment region 52A of the rear seat airbag 52 and rotates the extension motor 44 by the derived rotation amount.

Operation

Next, the operation and advantageous effects of the third embodiment will be described.

In the vehicle occupant restraint system 10B according to the third embodiment, at the time of a collision of the vehicle 12, when the front seat 14 is located in the second region, that is, a position spaced apart from the deployment region 52A of the rear seat airbag 52, the angular position of the seat back 20 of the front seat 14 is changed such that the front seat 14 is located at the supporting position to support the rear seat airbag 52. In the vehicle occupant restraint system 10B according to the third embodiment, the front seat 14 includes the headrest 22B including the retractable mechanism 42, and the seat control unit 104B executes control to change the position of the front seat 14 by controlling the retractable mechanism 42 of the headrest 22B. Therefore, even when, for example, the position of the front seat 14 and the position of the rear seat airbag 52 are located away from each other, the headrest 22B can be positioned at the supporting position to support the deployed and inflated rear seat airbag 52 by extending the headrest 22B. Therefore, the rear seat airbag 52 is stably supported by the front seat 14 irrespective of seat layout.

In the third embodiment, the seat control unit 104B executes control to change the angular position of the seat back 20 from the driving angular position R4 to the comfortable angular position R5 and to extend the headrest 22B toward the deployment region 52A of the rear seat airbag 52; however, the disclosure is not limited thereto. When, for example, the position of the seat cushion 18 in the vehicle front and rear direction is located behind the position shown in FIG. 5 and the headrest 22B contacts with the deployment region 52A of the rear seat airbag 52 without extending the headrest 22B at the time when the seat back 20 is reclined in the arrow A1 direction, the seat control unit 104B does not need to control the retractable mechanism 42.

As long as the headrest 22B is able to contact with the deployment region 52A of the rear seat airbag 52, the seat control unit 104B may, for example, execute only control to extend the headrest 22B toward the deployment region 52A of the rear seat airbag 52 without changing the angular position of the seat back 20.

As long as the headrest 22B is able to contact with the deployment region 52A of the rear seat airbag 52, the seat control unit 104B may, for example, execute control to extend the headrest 22B toward the deployment region 52A of the rear seat airbag 52 and control to move the seat cushion 18 of the front seat 14 in the vehicle rearward direction without changing the angular position of the seat back 20.

As long as the headrest 22B is able to contact with the deployment region 52A of the rear seat airbag 52, the seat control unit 104B may, for example, execute control to move the seat cushion 18 of the front seat 14 in the vehicle rearward direction without changing the angular position of the seat back 20 or executing control to extend the headrest 22B toward the deployment region 52A of the rear seat airbag 52.

Alternatively, the seat control unit 104B may execute control to move the seat cushion 18 of the front seat 14 in the vehicle front and rear direction and control to extend the headrest 22B toward the deployment region 52A of the rear seat airbag 52 while moving the angular position of the seat back 20 in the arrow A1 direction or the arrow A2 direction in FIG. 5.

In the third embodiment, at least one of the position and the angular position of the front seat 14 is changed by the seat control unit 104B such that the headrest 22B contacts with the deployment region 52A of the rear seat airbag 52. At this time, when the seat back 20 is excessively located away from the legs of the occupant P2 seated on the rear seat 16, the inflator control unit 106 may inflate and deploy the knee airbag 58 by increasing the amount of gas to be supplied to the knee airbag 58 and supplying gas from the second inflator 60 to the knee airbag 58 based on the increased amount of gas. The amount of gas is increased as the seat back 20 is distanced from the deployment region 58A of the knee airbag 58.

Thus, a distance between the knee airbag 58 and the legs of the occupant P2 seated on the rear seat 16 is appropriately compensated, so impact on the legs of the occupant P2 seated on the rear seat 16 is reduced by the knee airbag 58.

Fourth Embodiment

A vehicle occupant restraint system 10C according to a fourth embodiment of the disclosure will be described. Initially, the vehicle 12 to which the vehicle occupant restraint system 10C according to the fourth embodiment is applied will be described. The configurations of the vehicle occupant restraint system 10C and the vehicle 12 are the same as those of the vehicle occupant restraint system 10B and the vehicle 12 shown in FIG. 5 and FIG. 6, so only the difference will be described below.

In the third embodiment, the region setting unit 102B sets the second region to a region spaced apart from the deployment region 52A of the inflated and deployed rear seat airbag 52; whereas a region setting unit 102C of the fourth embodiment sets the first region in addition to the second region. A method of setting the first region and the second region is the same as that of the above-described embodiments, so the description thereof will not be repeated.

At the time of a collision of the vehicle 12, when the front seat 14 is located in the first region, that is, around the deployment region 52A of the rear seat airbag 52, the seat control unit 104C of the fourth embodiment executes control as in the case of the first embodiment and the modification of the first embodiment. At the time of a collision of the vehicle 12, when the front seat 14 is located in the second region, that is, a position spaced apart from the deployment region 52A of the rear seat airbag 52, the seat control unit 104C executes control as in the case of the third embodiment.

Next, the flow of an occupant restraint control process to be executed by the vehicle occupant restraint system 10C will be described with reference to the flowchart of FIG. 8. The processes of step S40, step S41, step S42, step S43, and step S44 of the flowchart shown in FIG. 8 are the same as the processes of step S10, step S11, step S12, step S13, and step S14 of the flowchart of the first embodiment shown in FIG. 3, so the description will not be repeated, and only the processes after step S43 is negative, that is, different processes, will be described.

In the vehicle occupant restraint system 10C according to the fourth embodiment, as shown in FIG. 8, when the ECU 100 determines in step S43 that the front seat 14 is not located in the first region (NO in step S43), the ECU 100 determines whether at least part of the front seat 14 is located in the second region based on output signals from the seat position detection sensor 33 (step S45). The processes after step S45 are executed similarly to the processes after step S34 of the flowchart of the third embodiment shown in FIG. 7.

Operation

Next, the operation and advantageous effects of the fourth embodiment will be described.

In the vehicle occupant restraint system 10C according to the fourth embodiment, at the time of a collision of the vehicle 12, when the front seat 14 is located in the first region, that is, around the deployment region 52A of the rear seat airbag 52, the angular position of the seat back 20 of the front seat 14 is changed from the highly comfortable angular position R3 to the driving angular position R1, that is, in a direction away from the deployment region 52A of the rear seat airbag 52. Therefore, interference between the front seat 14 and the rear seat airbag 52 is reduced.

In the vehicle occupant restraint system 10C according to the fourth embodiment, additionally, at the time of a collision of the vehicle 12, when the front seat 14 is located in the second region, that is, a position spaced apart from the deployment region 52A of the rear seat airbag 52, the angular position of the seat back 20 of the front seat 14 is changed such that the front seat 14 is located at the supporting position to support the rear seat airbag 52. In the vehicle occupant restraint system 10C according to the fourth embodiment, the front seat 14 includes the headrest 22B including the retractable mechanism 42, and a seat control unit 104C executes control to change the position of the front seat 14 by controlling the retractable mechanism 42 of the headrest 22B. Therefore, even when, for example, the position of the front seat 14 and the position of the rear seat airbag 52 are located away from each other, the headrest 22B can be positioned at the supporting position to support the deployed and inflated rear seat airbag 52 by extending the headrest 22B. Hence, the rear seat airbag 52 is stably supported by the front seat 14 irrespective of seat layout.

As described above, with the vehicle occupant restraint system 10C according to the fourth embodiment, at the time of a collision of the vehicle 12, even when the front seat 14 is located in any of the first region and the second region, the angular position of the seat back 20 of the front seat 14 is changed according to the position of the rear seat airbag 52. Therefore, the positional relation between the front seat 14 and the rear seat airbag 52 is appropriately controlled.

Fifth Embodiment

A vehicle occupant restraint system 10D according to a fifth embodiment of the disclosure will be described. Initially, the vehicle 12 to which the vehicle occupant restraint system 10D according to the fifth embodiment is applied will be described. The configurations of the vehicle occupant restraint system 10D and the vehicle 12 are the same as those of the vehicle occupant restraint system 10C and the vehicle 12 of the fourth embodiment shown in FIG. 5 and FIG. 6, so only the difference will be described below.

In the fourth embodiment, at the time of a collision of the vehicle 12, when the front seat 14 is located in the first region, that is, around the deployment region 52A of the rear seat airbag 52, the seat control unit 104C executes control as in the case of the first embodiment and the modification of the first embodiment. In contrast to the fourth embodiment, in the fifth embodiment, at the time of a collision of the vehicle 12, when the front seat 14 is located around the first region, that is, the deployment region 52A of the rear seat airbag 52, a seat control unit 104D executes control as in the case of the second embodiment.

Next, the flow of an occupant restraint control process to be executed by the vehicle occupant restraint system 10D will be described with reference to the flowchart of FIG. 9. The processes of step S50, step S51, step S52, and step S53 of the flowchart shown in FIG. 9 are the same as the processes of step S40, step S41, step S42, and step S43 of the flowchart of the fourth embodiment shown in FIG. 8, so the description will not be repeated, and only the processes after step S53, that is, different processes, will be described.

In the vehicle occupant restraint system 10D according to the fifth embodiment, as shown in FIG. 9, when the ECU 100 determines in step S53 that the front seat 14 is not located in the first region (NO in step S53), the ECU 100 determines whether at least part of the front seat 14 is located in the second region based on output signals from the seat position detection sensor 33 (step S54). When at least part of the front seat 14 is located in the second region (YES in step S54), the seat control unit 104D executes control to change the angular position of the seat back 20 of the front seat 14 such that the front seat 14 is located at the supporting position to support the rear seat airbag 52 (step S55). In other words, the seat control unit 104D executes a process similar to step S34 (see FIG. 7) of the third embodiment.

On the other hand, when the seat control unit 104D determines in step S53 that the front seat 14 is located in the first region (YES in step S53), the seat control unit 104D executes control to change the angular position of the seat back 20 of the front seat 14 such that the front seat 14 is located at the supporting position to support the rear seat airbag 52 (step S55). In other words, the seat control unit 104D executes a process similar to step S24 (see FIG. 4) of the second embodiment.

Operation

Next, the operation and advantageous effects of the fifth embodiment will be described.

In the vehicle occupant restraint system 10D according to the fifth embodiment, at the time of a collision of the vehicle 12, when the front seat 14 is located around in first region, that is, around the deployment region 52A of the rear seat airbag 52, the angular position of the seat back 20 of the front seat 14 is changed such that the front seat 14 is located at the supporting position to support the rear seat airbag 52. Therefore, the rear seat airbag 52 is stably supported by the front seat 14 irrespective of seat layout.

In the vehicle occupant restraint system 10D according to the fifth embodiment, additionally, at the time of a collision of the vehicle 12, when the front seat 14 is located in the second region, that is, a position spaced apart from the deployment region 52A of the rear seat airbag 52, the angular position of the seat back 20 of the front seat 14 is changed such that the front seat 14 is located at the supporting position to support the rear seat airbag 52. In the vehicle occupant restraint system 10D according to the fifth embodiment, the front seat 14 includes the headrest 22B including the retractable mechanism 42, and the seat control unit 104D executes control to change the position of the front seat 14 by controlling the retractable mechanism 42 of the headrest 22B. Therefore, even when, for example, the position of the front seat 14 and the position of the rear seat airbag 52 are located away from each other, the headrest 22B can be positioned at the supporting position to support the deployed and inflated rear seat airbag 52 by extending the headrest 22B. Hence, the rear seat airbag 52 is stably supported by the front seat 14 irrespective of seat layout.

As described above, with the vehicle occupant restraint system 10D according to the fifth embodiment, at the time of a collision of the vehicle 12, even when the front seat 14 is located in any of the first region and the second region, the angular position of the seat back 20 of the front seat 14 is changed according to the position of the rear seat airbag 52. Therefore, the positional relation between the front seat 14 and the rear seat airbag 52 is appropriately controlled.

In the above-described embodiments, the reclining motor 38 is provided in the seat cushion 18; however, the disclosure is not limited thereto. The reclining motor 38 may be provided in, for example, the seat back 20.

In the above-described embodiments, the position sensor 32 that detects the position of the front seat 14 in the vehicle front and rear direction, the angular position sensor 40 that detects the angular position of the seat back 20, and the headrest position sensor 46 that detects the position of the headrest 22 in the seat up and down direction are rotary encoders; however, the disclosure is not limited thereto. For example, an optical displacement sensor, an ultrasonic displacement sensor, or the like may be used. Any sensors may be used as long as the sensors are respectively capable of detecting the position of the front seat 14 in the vehicle front and rear direction, the angular position of the seat back 20, and the position of the headrest 22 in the seat up and down direction.

In the above-described embodiments, the seating sensor 62 is a sensor that detects the seating pressure on the seat cushion 18; however, the disclosure is not limited thereto. The seating sensor 62 may be not only a sensor that detects the seating pressure on a specific portion in the seat cushion 18 but also a sensor capable of acquiring a seating pressure distribution in a predetermined range of the seat cushion 18. Other than the seating sensor 62, a weight sensor that detects weight by providing a strain gauge on the seat rail may be adopted.

In the above-described embodiments, each of the seat control units 104, 104A, 104B, 104C, 104D executes control to change at least one of the position and the angular position of the front seat 14 only when the occupant P2 is seated on the rear seat 16; however, the disclosure is not limited thereto. The seat control unit 104 may execute the control even when no occupant P2 is seated on the rear seat 16.

In the above-described embodiments, a determination as to whether the front seat 14 is located in the predetermined region is performed in parallel with the process of inflating and deploying the rear seat airbag 52 and the knee airbag 58; however, the disclosure is not limited thereto. A determination as to whether the front seat 14 is located in the predetermined region may be performed, for example, in advance of detection of a collision.

In the above-described embodiments, the vehicle 12 is of a two-row seat type; however, the disclosure is not limited to a two-row seat type. As long as a vehicle has a seat layout having front and rear seats, the disclosure is applicable to a vehicle having a plurality of seat rows, such as three-row seats.

In the above-described embodiments, each of the seat control units 104, 104A, 104B, 104C, 104D executes the control in a state where the vehicle 12 is being driven autonomously; however, the disclosure is not limited thereto. The control may be executed in a state where the vehicle 12 is not being driven autonomously and is being driven normally. However, when the control is executed in a state where the vehicle 12 is being driven autonomously, it is advantageous in that the occupant P2 seated on the rear seat 16 is appropriately protected by the rear seat airbag 52 although the flexibility of seat layout is increased.

Examples of the disclosure are described above; however, the disclosure is not limited to the above-described embodiments and may be, of course, modified into various forms without departing from the scope of the disclosure.

What is claimed is:

1. A vehicle occupant restraint system comprising:
   an airbag configured to deploy downward into a vehicle cabin from a roof of the vehicle cabin by receiving gas supplied;
   a collision sensor configured to detect a collision of a vehicle;
   a seat position detection sensor configured to detect at least one of a position and an angular position of a seat on which an occupant is seated; and
   an electronic control unit configured to set a predetermined region according to a position of the airbag,
   the electronic control unit configured to, when the collision sensor detects a collision of the vehicle and the seat position detection sensor detects that the seat is located in the predetermined region, execute control to change at least one of the position and the angular position of the seat.

2. The vehicle occupant restraint system according to claim 1, wherein:
   the electronic control unit is configured to set a first region around a deployment region of the airbag; and
   the electronic control unit is configured to, when the collision sensor detects a collision of the vehicle and the seat position detection sensor detects that the seat is located in the first region, change at least one of the position and the angular position of the seat such that the seat is located away from the deployment region of the airbag.

3. The vehicle occupant restraint system according to claim 2, wherein the electronic control unit is configured to execute the control such that the seat is located at a supporting position to support the airbag.

4. The vehicle occupant restraint system according to claim 1, wherein:
   the electronic control unit is configured to set a first region around a deployment region of the airbag; and
   the electronic control unit is configured to, when the collision sensor detects a collision of the vehicle and the seat position detection sensor detects that the seat is located in the first region, execute control to change at least one of the position and the angular position of the seat such that the seat is located at a supporting position to support the airbag.

5. The vehicle occupant restraint system according to claim 1, wherein:
   the electronic control unit is configured to set a second region spaced apart from a deployment region of the airbag; and
   the electronic control unit is configured to, when the collision sensor detects a collision of the vehicle and the seat position detection sensor detects that the seat is located in the second region, execute control to change at least one of the position and the angular position of the seat such that the seat is located at a supporting position to support the airbag.

6. The vehicle occupant restraint system according to claim 3, wherein:
   the seat includes a headrest having a retractable mechanism; and
   the electronic control unit is configured to execute control to position the seat at a supporting position to support the airbag by controlling the retractable mechanism of the headrest.

7. The vehicle occupant restraint system according to claim 1, wherein the electronic control unit is configured to execute the control in a state where the vehicle is being driven autonomously.

8. A vehicle occupant restraint system comprising:
   an airbag configured to deploy downward into a vehicle cabin from a roof of the vehicle cabin by receiving gas supplied;
   a collision sensor configured to detect a collision of a vehicle;
   a seat position detection sensor configured to detect at least one of a position and an angular position of a seat on which an occupant is seated; and
   an electronic control unit configured to set a predetermined region according to a position of the airbag, the electronic control unit configured to, when the collision sensor detects a collision of the vehicle and the seat position detection sensor detects that the seat is located in the predetermined region, execute control to change at least one of the position and the angular position of the seat,
   wherein the seat includes a headrest having a retractable mechanism; and
   wherein the electronic control unit is configured to execute control to position the seat at a supporting position to support the airbag by controlling the retractable mechanism of the headrest.

9. The vehicle occupant restraint system according to claim 8, wherein:
   the electronic control unit is configured to set a first region around a deployment region of the airbag; and
   the electronic control unit is configured to, when the collision sensor detects a collision of the vehicle and the seat position detection sensor detects that the seat is located in the first region, change at least one of the position and the angular position of the seat such that the seat is located away from the deployment region of the airbag.

10. The vehicle occupant restraint system according to claim 8, wherein:
    the electronic control unit is configured to set a first region around a deployment region of the airbag; and
    the electronic control unit is configured to, when the collision sensor detects a collision of the vehicle and the seat position detection sensor detects that the seat is located in the first region, execute control to change at least one of the position and the angular position of the seat such that the seat is located at a supporting position to support the airbag.

11. The vehicle occupant restraint system according to claim 8, wherein:
    the electronic control unit is configured to set a second region spaced apart from a deployment region of the airbag; and
    the electronic control unit is configured to, when the collision sensor detects a collision of the vehicle and the seat position detection sensor detects that the seat is located in the second region, execute control to change at least one of the position and the angular position of the seat such that the seat is located at a supporting position to support the airbag.

12. The vehicle occupant restraint system according to claim 8, wherein the electronic control unit is configured to execute the control in a state where the vehicle is being driven autonomously.

\* \* \* \* \*